US006736715B2

(12) United States Patent
Kuhn

(10) Patent No.: US 6,736,715 B2
(45) Date of Patent: May 18, 2004

(54) ELECTRICAL JUNCTION ASSEMBLY AND RELATED SPLICING METHOD

(76) Inventor: Rorey Kuhn, 11361 Gaviota Ave., Granada Hills, CA (US) 91344

( * ) Notice: Subject to any disclaimer, the term of this patent is extended or adjusted under 35 U.S.C. 154(b) by 204 days.

(21) Appl. No.: 09/798,690

(22) Filed: Mar. 3, 2001

(65) Prior Publication Data

US 2002/0042990 A1 Apr. 18, 2002

Related U.S. Application Data

(60) Provisional application No. 60/187,001, filed on Mar. 3, 2000.

(51) Int. Cl.[7] ............................................. H01R 43/00
(52) U.S. Cl. ...................... 451/868; 451/869; 451/872; 451/402.06
(58) Field of Search ........................ 29/868, 869, 870, 29/871, 872, 873, 402.01, 402.03, 402.06, 402.14; 156/49; 174/73.1, 87, 88, 94

(56) References Cited

U.S. PATENT DOCUMENTS 4,963,700 A * 10/1990 Olsen et al. ............. 174/138 F
5,412,861 A * 5/1995 Fudoo et al. ............... 29/564.2
5,563,372 A * 10/1996 Messelhi ..................... 174/60

* cited by examiner

Primary Examiner—Timothy V. Eley
(74) Attorney, Agent, or Firm—Kelly Bauersfeld Lowry & Kelley, LLP

(57) ABSTRACT

A protective electrical junction box assembly and method of splicing which eliminates the expense and timed needed to pull new wire to add new wire or an electrical device to pre-existing wiring is disclosed. In use, a first protective sheath surrounding a first set of pre-existing electrical wires is separated to expose the first set of wires. The exposed portion of these wires is placed into apertures of a protective junction box. The separated ends of the first sheath are attached to the junction box. A portion of the second set of typically new wires is placed into the junction box. The second sheath surrounding these wires is also attached to the junction box. The first set of electrical wires are then spliced to the second set of wires within the junction box before covering and securing the junction box in place.

14 Claims, 6 Drawing Sheets

ELECTRICAL JUNCTION ASSEMBLY AND RELATED SPLICING METHOD

RELATED APPLICATION

This application claims priority from provisional application Ser. No. 60/187,001 filed Mar. 3, 2000.

BACKGROUND OF THE INVENTION

The present invention relates to electrical wire splicing. More particularly, the present invention relates to a junction box assembly and method which facilitates adding new wiring, such as from new electrical devices, to pre-existing wiring.

Quite often electricians have needed to intercept power from existing wiring in order to provide additional power for additional devices. This need usually occurs in attics and crawl spaces of homes and businesses. When an electrician has to add a device to pre-existing wiring, the electrician typically cuts an existing conduit or cable, sets a junction box and re-pulls new wires. The new wires must be re-pulled as the existing wires are too short to splice and add new wires.

This process is laborious, expensive and time consuming. Furthermore, slicing open conduits in crawl spaces and attics creates the possibility of hazards such as fires, shock or shorts.

Accordingly, there is a need for an assembly which eliminates the need to pull new wire in order to splice in wires from an added electrical device. The assembly should minimize hazards such as fires, shock and shorts. The present invention fulfills these needs and provides other related advantages.

SUMMARY OF THE INVENTION

The present invention resides in a protective electrical junction box assembly which eliminates the expense and timed needed to pull new wire to add new wire or an electrical device to pre-existing wiring. In a first embodiment, the junction box has threaded flex connectors extending from the box. Slots are formed in the box and through the flex connectors for receiving existing wires to be spliced. In another embodiment, the box includes a cable retaining connector also having slots but connectable to a clamp, typically associated with the retention connector, which holds the cable securely in place to the junction box.

In use, a first protective sheath surrounding a first set of typically pre-existing electrical wires is separated to expose the first set of wires. The exposed portion of these wires is placed into apertures of the junction box. The separated ends of the first sheath are attached to the protective junction box. A portion, often the ends, of a second set of typically new wires is placed into the junction box. The second sheath surrounding these wires is also attached to the junction box. The first set of electrical wires are then spliced to the second set of wires within the junction box. The assembly and method of splicing of the present invention eliminates the need to pull new wire as the new wire is spliced into the existing wire.

When the protective sheath comprises a conduit, such as metal or romex conduit, the junction box having the pair of hollow flex connectors which extend from the junction box is used. An open-faced slot is pre-formed in the junction box and the flex connectors for inserting the exposed first set of wires within the junction box. The separated ends of the protective conduit sheath are attached to the junction box by forcing the ends onto the hollow flex connectors, often by twisting.

When the protective sheath comprises cable, the junction box having the retention connectors defining junction box apertures is used. An open-faced slot is pre-formed in the junction box and retention slots for placement of the exposed first set of electrical wires within the junction box. The cable is inserted into the retention connectors and clamped to the junction box, typically with clamps associated with the retention connectors.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 2:
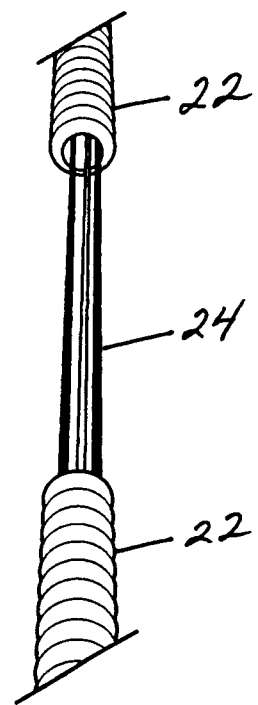
FIG. 2 is a partial perspective view of electrical conduit which has been cut to expose encased electrical wires therein.

As shown in the drawings for purposes of illustration, the present invention is concerned with an electrical junction box assembly, generally referred to by the reference number 10 in FIGS. 1–6 and by the reference number 12 in FIGS. 7–12.

Figure 1:
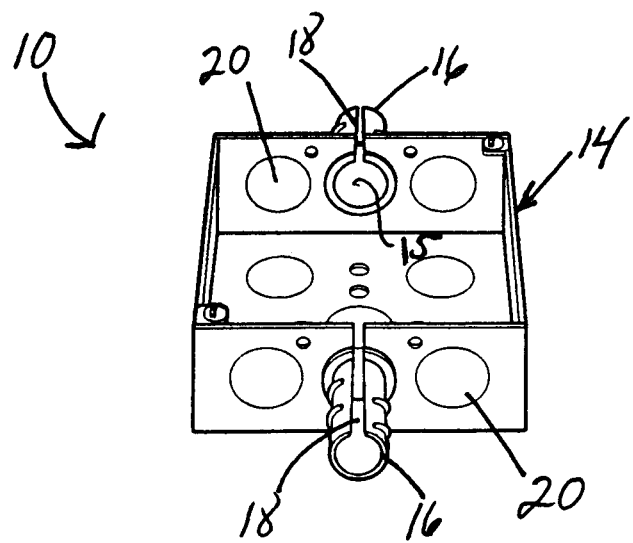
FIG. 1 is a perspective view of an electrical junction box which embodies the present invention.

With reference to FIG. 1, in a first embodiment the assembly 10 of the invention comprises a junction box 14 that is typically four or five inches square and two inches deep, although not limited to such dimensions. Hollow threaded flex connectors 16 extend from the junction box 14 to form junction box apertures 15, which are preferably generally opposite one another. The flex connectors are approximately one-half inch in length and have a slot 18 cut through the top of each which extends into the box 14. The open-faced slot 18 is typically 0.1875 inch in width in the four inch box 14 so as to accept "12" and "14" gauge wire. The open-faced slot 18 of the five inch box 14 is 0.250 inch so as to accept up to "8" gauge wire. The box 14 also has punch-out inserts 20 which form the necessary apertures when removed for feeding in additional wires as needed.

The box 14 can intercept 0.500 inch or 0.750 inch flex conduit 22, such as the metal or romex conduit typically used in the industry, which protectively encases existing electrical wires 24. The conduit 22 is preferably cut at a 45° angle, then the conduit 22 is scored through one spiral with caution so as not to cut too deep into the flex conduit 22 and damage the existing wire 24. The flex conduit 22 is then untwisted and pulled apart to expose the wires 24, as illustrated in FIG. 2. The conduit 22 is preferably cut over a floor or ceiling joist so that the box 14 can later be securely fixed to that item.

Figure 4:
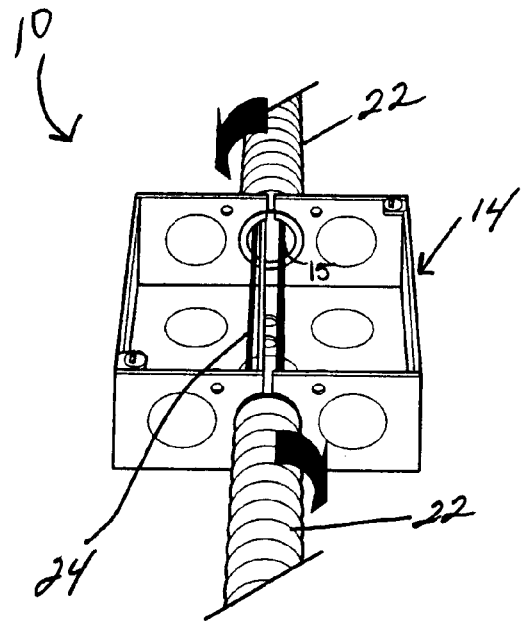
FIG. 4 illustrates the step of fastening the cut ends of the conduit to the junction box.
Figure 3:
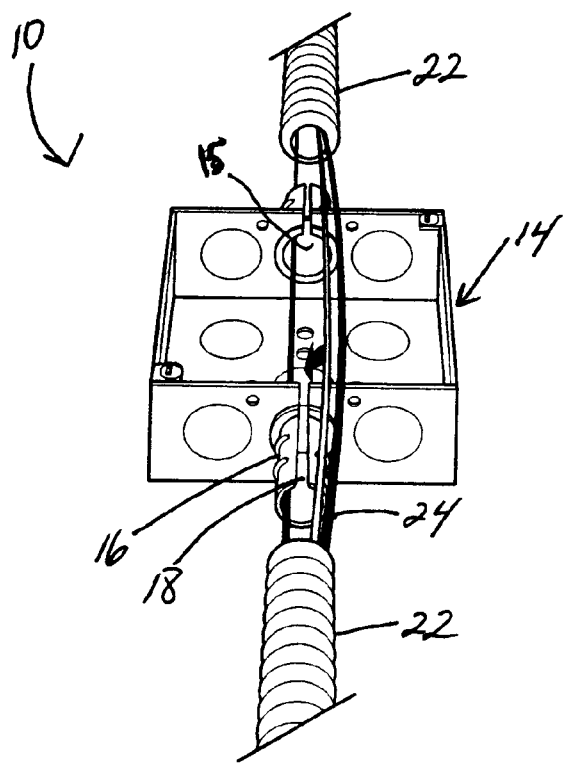
FIG. 3 illustrates the exposed wires of FIG. 2 being inserted into the junction box of FIG. 1.

As shown in FIG. 3, a portion of the exposed wires 24 is carefully placed through the open-faced slots 18 so that all of the wires 24 are approximately centered within the tubular flex connectors 16 and reside, in part, within the junction box 14. The flex conduit 22 is then attached to the flex connectors 16 by friction fit, typically by back twisting approximately three turns to thread the flex conduit 22 onto the flex connectors 16, as illustrated in FIG. 4. The existing wires 24 are now secure within the junction box 14.

Figure 6:
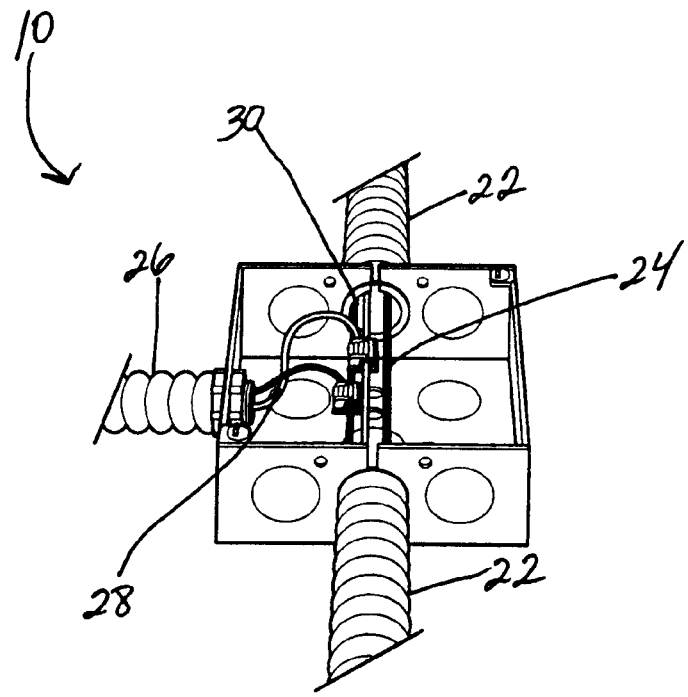
FIG. 6 illustrates the step of splicing the external wires with the existing wires within the junction box.
Figure 5:
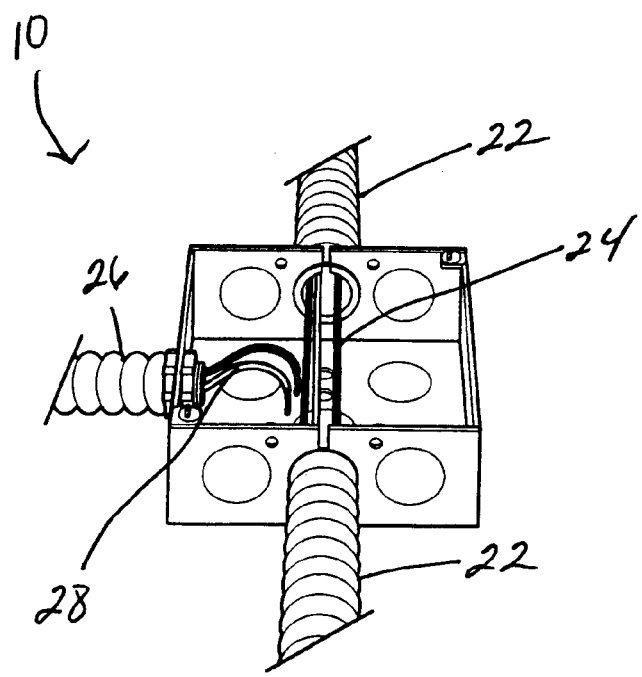
FIG. 5 illustrates the step of inserting external wires into the junction box.

The conduit or romex 26 containing the new wires 28, such as from a device to be added, such as a fan, smoke detector, light, switch, etc., is joined to the junction box 14 as shown in FIG. 5. The new electrical wires 28 are then spliced to the existing wires 24 using a splice connector 30, such as 3M Scotchlok #567 splice connectors, as shown in FIG. 6.

Straps (not shown) can then be applied to the conduit 22 and 26 on all exits of the junction box 14 and an appropriate cover attached to the open face of the junction box 14. The box junction 14 is then securely fixed to an adjacent beam, joist or the like.

Referring to FIGS. 7–12, another junction box assembly 12 is shown wherein the protective junction box 32 is modified so as to accept and retain cable wiring 34. The junction box 32 includes opposing circular cable retention connectors 36 which define junction box apertures 35. An open-faced slot 38 extends through the junction box 32 and retention connectors 36. Clamps 40 adjustably close off the apertures 35 and cable retention connectors 36 by threading screws 42 through the cable retention connectors 36.

Figure 8:
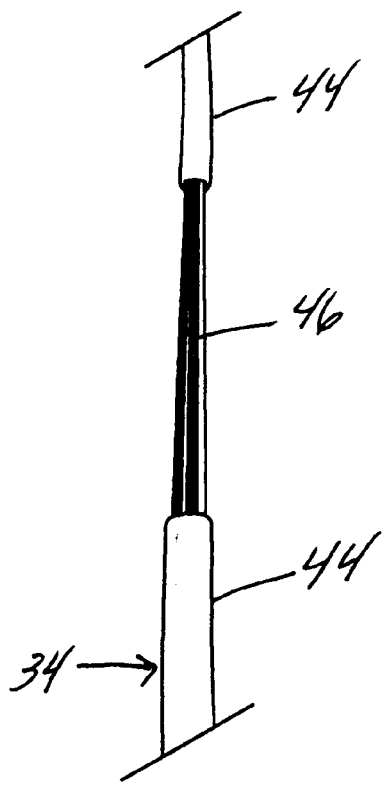
FIG. 8 is a partial perspective view of a cable sheath which has been cut to expose encased wires therein.
Figure 7:
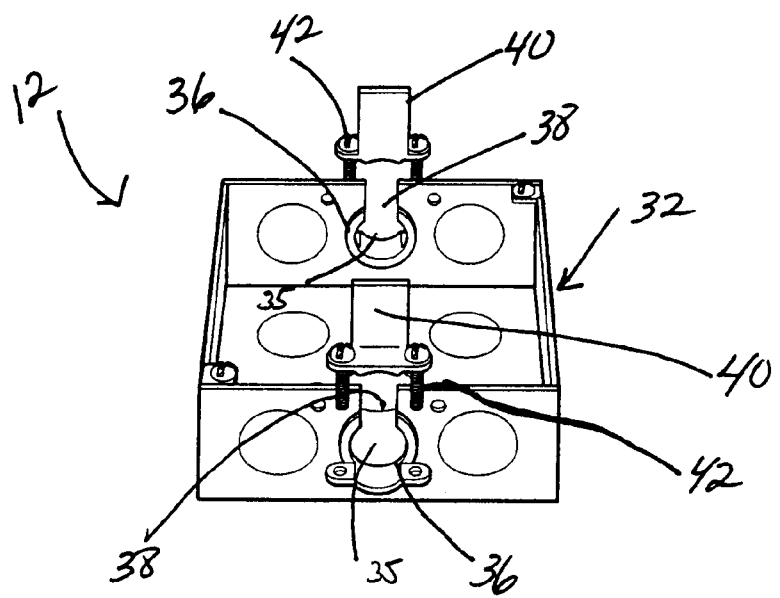
FIG. 7 is a perspective view of an alternative electrical junction box embodying the present invention.
Figure 10:
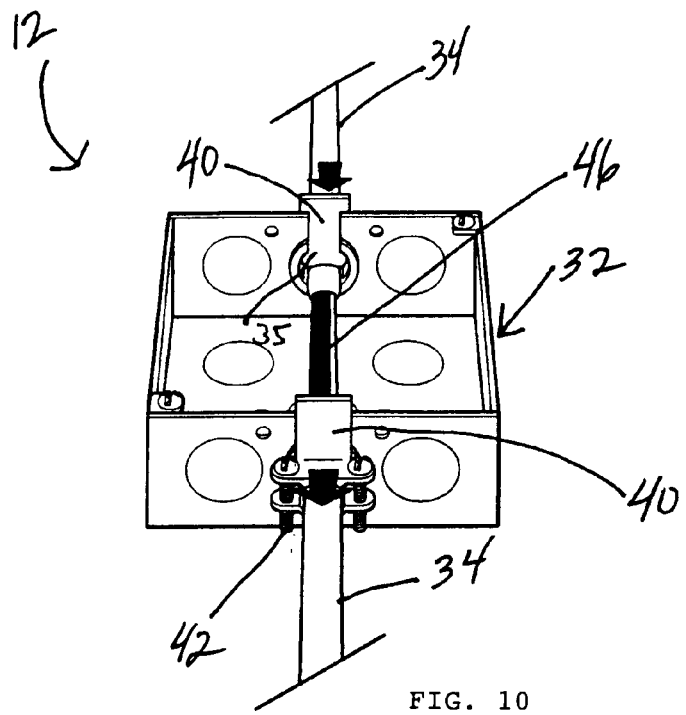
FIG. 10 illustrates the step of clamping the cut ends of the cable sheath to the junction box of FIG. 7.
Figure 9:
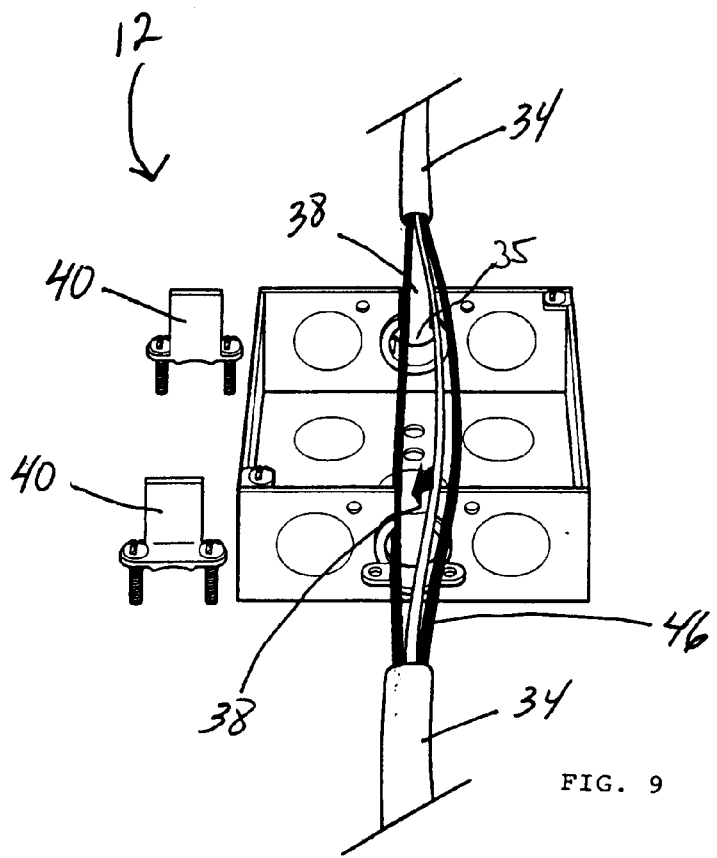
FIG. 9 illustrates the exposed wires of FIG. 8 being inserted into the junction box of FIG. 7.
Figure 12:
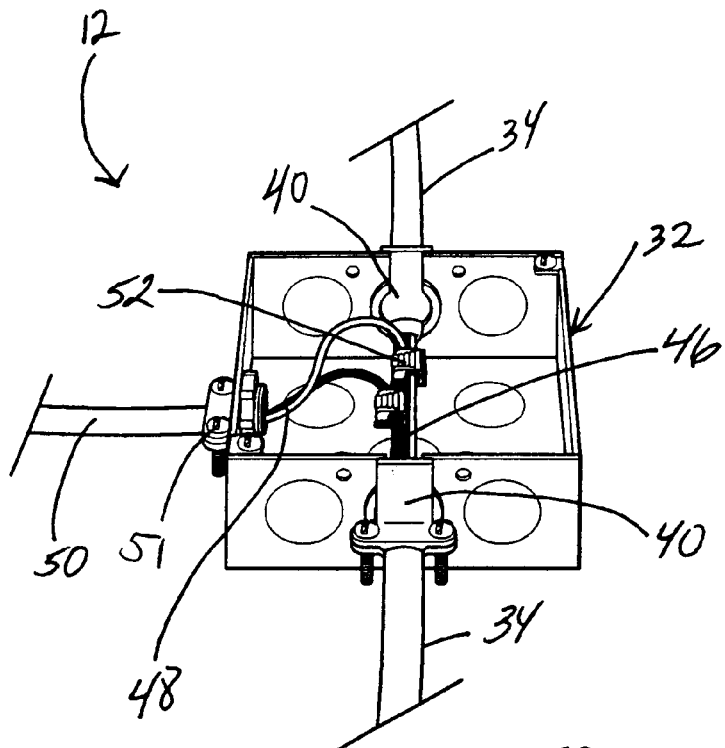
FIG. 12 illustrates the step of splicing the exposed wires to the external wires within the junction box.

An outer cable sheath 44 of the cable wiring 34 is cut and pulled apart so as to reveal the existing electrical wires 46 therein, as shown in FIG. 8. The wires 46 are inserted through the slot 38 so as to reside within the junction box 32 and the circular retention connectors 36, as shown in FIG. 9. The screws 42 of the clamps 40 are threaded into the connectors 36 until the clamps 40 hold the cable wiring 34 securely, as shown in FIG. 10.

Figure 11:
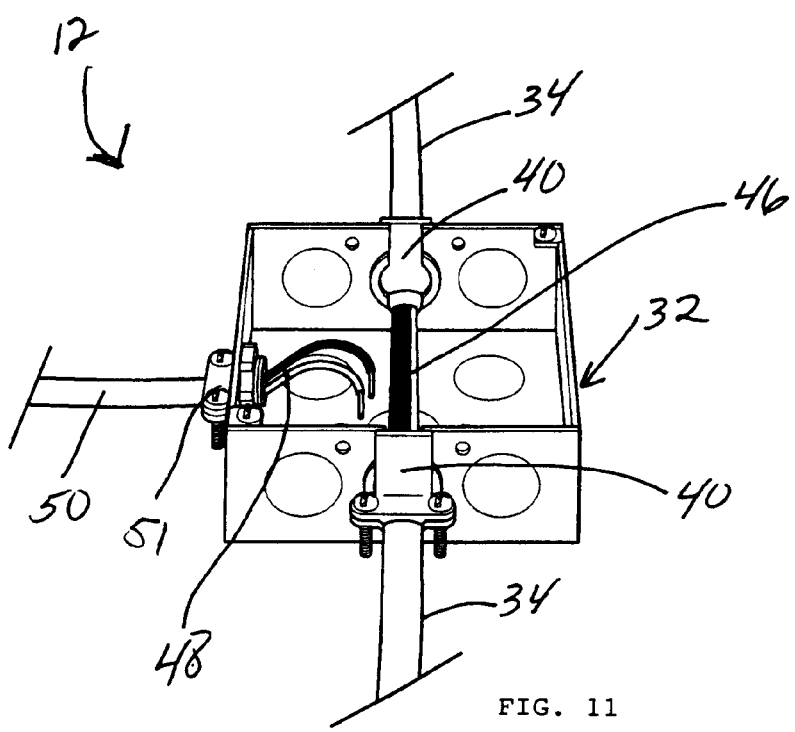
FIG. 11 illustrates the insertion of external wires into the junction box.

New wires 48 from a cable 50 needing to be added to the existing wires 46 are inserted into the junction box 32, as illustrated in FIG. 11. If the new wires 48 are encased within a cable 50, the cable 50 is clamped onto the junction box 32 with clamp 51. If the new wires 48 are encased in conduit, then it is attached in an appropriate manner, as illustrated in FIGS. 5 and 6. The new wires 48 are then spliced to the existing wires 46 using a splice connector 52, such as 3M Scotchlok #567 splice connectors shown in FIG. 12. An appropriate cover (not shown) is fastened to the junction box 32 and the cables 34 and 50 are then secured to adjoining joists or the like to complete the project.

By utilizing the junction box assemblies 10 and 12 of the present invention, the electrician saves time and money by not having to re-pull wires and locating them where the conduit or cable terminates. Additionally, possible fire, shock and short hazards are avoided as the junction boxes 14 and 32 provide a protective casing for the spliced wires.

Although several embodiments have been described in detail for purposes of illustration, various modifications may be made without departing from the scope and spirit of the invention. Accordingly, the invention is not to be limited, except as by the appended claims.

What is claimed is:

1. A method for splicing a first set of electrical wires extending through a first protective sheath to a second set of electrical wires extending through a second protective sheath, comprising the steps of:

separating the first protective sheath to expose the first set of electrical wires;

placing an exposed portion of the first set of electrical wires into a protective junction box;

attaching separated ends of the first protective sheath to the protective junction box;

placing a portion of the second set of electrical wires into the protective junction box;

attaching an end of the second protective sheath to the protective junction box; and splicing the first set of electrical wires to the second set of electrical wires within the protective junction box.

2. The method of claim 1, wherein the first protective sheath comprises a conduit sheath.

3. The method of claim 2, wherein the attaching step includes forcing ends of the separated conduit onto a pair of hollow flex connectors extending from the protective junction box.

4. The method of claim 2, wherein the placing step includes inserting the exposed portion of the first set of electrical wires into open-faced slots extending through the protective junction box and a pair of threaded flex connectors extending therefrom.

5. The method of claim 1, wherein the first protective sheath comprises a cable sheath surrounding the first set of electrical wires.

6. The method of claim 5, wherein the attaching step includes clamping the separated ends of the cable sheath to the protective junction box.

7. The method of claim 6, wherein the attaching step includes the steps of inserting the separated ends of the cable sheath into retention connectors defining junction box apertures and clamping the cable sheath to the retention connectors with clamps associated with the retention connectors.

8. The method of claim 5, wherein the placing step includes inserting the portion of the first set of electrical wires into open-faced slots formed through the protective junction box and retention connectors defining junction box apertures.

9. A method for splicing a first set of electrical wires extending through a first protective conduit sheath to a second set of electrical wires extending through a second protective sheath, comprising the steps of:

separating the first protective sheath to expose the first set of electrical wires;

placing an exposed portion of the first set of electrical wires into a protective junction box;

attaching separated ends of the first protective conduit sheath onto a pair of hollow flex connectors extending from the protective junction box;

placing an exposed portion of the second set of electrical wires into the protective junction box;

attaching an end of the second protective sheath to the protective junction box; and splicing the first set of electrical wires to the second set of electrical wires within the protective junction box.

10. The method of claim 9, wherein the attaching step includes forcing the ends of the separated conduit sheath onto the pair of flex connectors.

11. The method of claim 9, wherein the placing step includes placing the exposed portion of the first set of wires through open-faced slots extending through the protective junction box and the pair of flex connectors.

12. A method for splicing a first set of electrical wires extending through a first protective cable sheath to a second set of electrical wires extending through a second protective sheath, comprising the steps of:

separating the first protective sheath to expose the first set of electrical wires;

placing an exposed portion of the first set of electrical wires into apertures of the protective junction box;

attaching separated ends of the first protective cable sheath to the protective junction box by clamping the separated ends of the cable sheath to the protective junction box;

placing a portion of the second set of electrical wires into the protective junction box;

attaching an end of the second protective sheath to the protective junction box; and splicing the first set of electrical wires to the second set of electrical wires within the protective junction box.

13. The method of claim 12, wherein the placing step includes inserting the exposed portion of the first set of electrical wires into open-faced slots formed through the protective junction box and retention connectors defining the junction box apertures.

14. The method of claim 13, wherein the attaching step includes the steps of inserting the separated ends of the cable sheath into retention connectors defining junction box apertures and clamping the cable sheath to the retention connectors with clamps associated with the retention connectors.

* * * * *